June 12, 1962
R. O. ECCLES
3,038,206
METHOD AND APPARATUS FOR SHAPING BANDED PLASTIC SHEETING
Filed Dec. 21, 1959
2 Sheets-Sheet 1
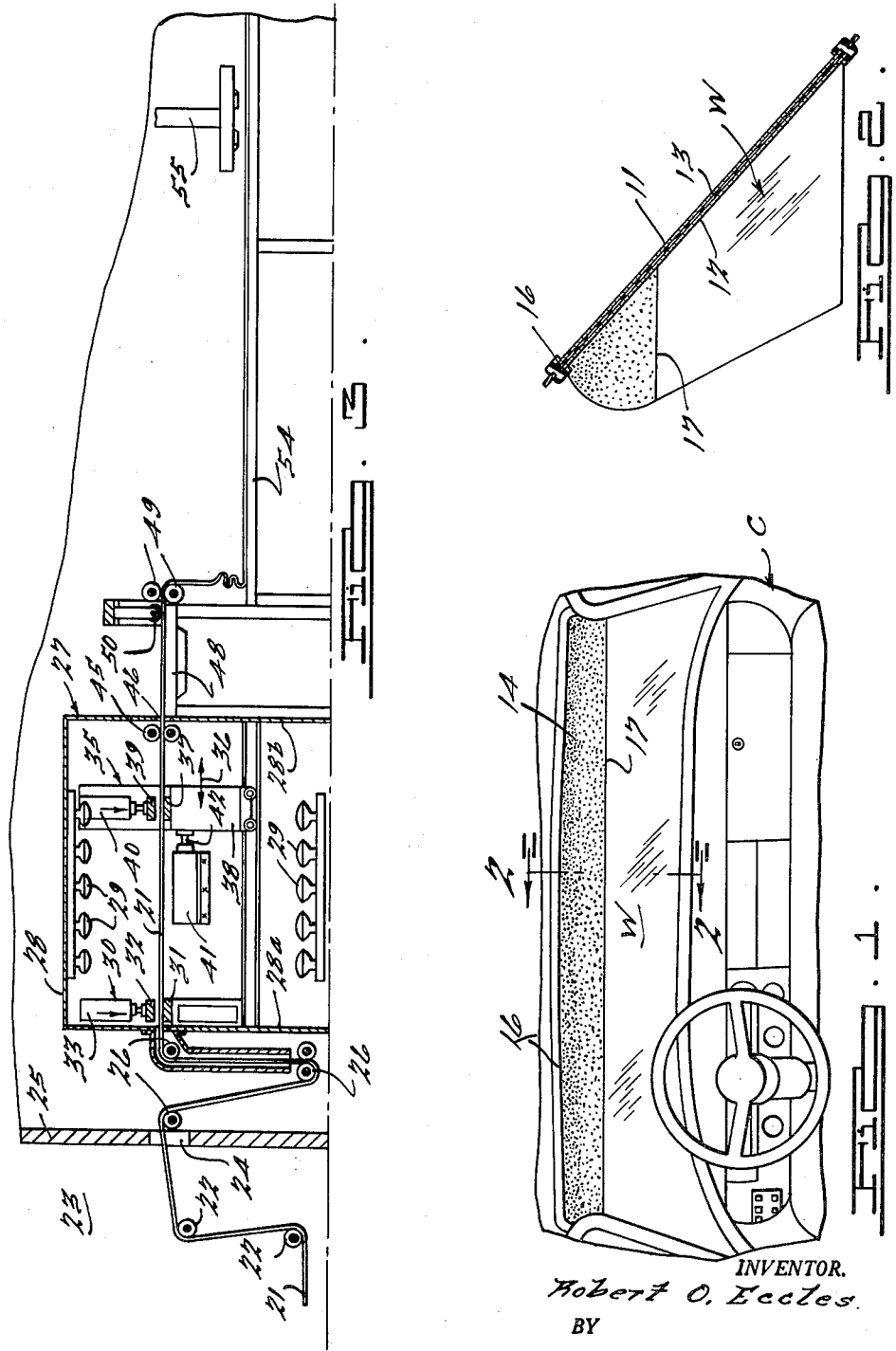
INVENTOR.
Robert O. Eccles
BY
Harness and Harris
ATTORNEYS.

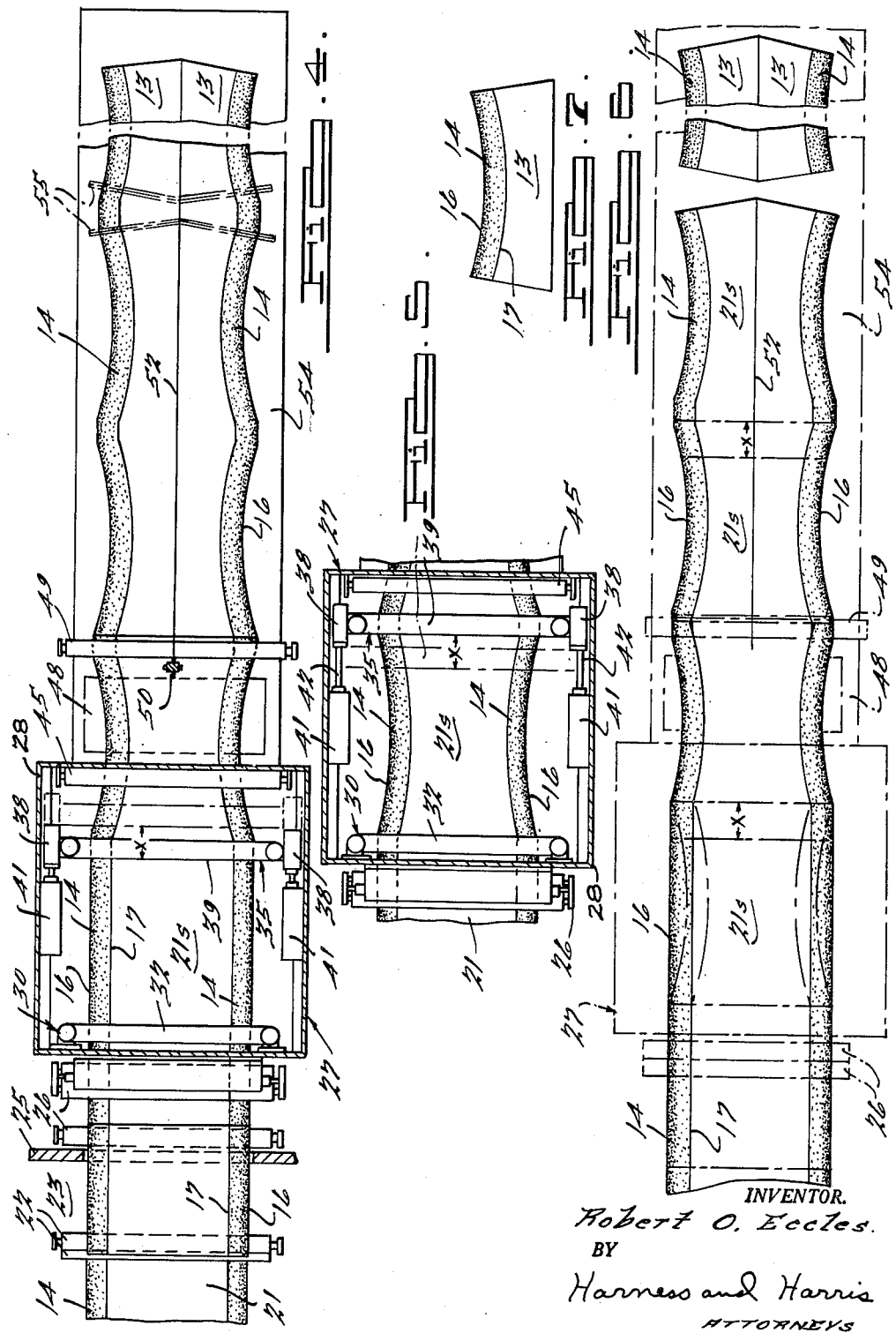

United States Patent Office 3,038,206
Patented June 12, 1962

3,038,206
METHOD AND APPARATUS FOR SHAPING BANDED PLASTIC SHEETING
Robert O. Eccles, Detroit, Mich., assignor to Chrysler Corporation, Highland Park, Mich., a corporation of Delaware
Filed Dec. 21, 1959, Ser. No. 861,130
5 Claims. (Cl. 18—47.5)

This invention relates to colored plastic interlayer sheeting adapted for glare shields or glare screens in laminated glass panels such as motor vehicle windshields. This invention is particularly concerned with the method of manufacture of such colored interlayer sheeting and the apparatus utilized to accomplish this method of manufacture.

In current motor vehicles the body styling is such that the windshields usually consist of a single large panel of laminated glass that extends in an arc across the upper front end portion of the vehicle body and is inclined upwardly and backwardly at a substantial angle to the vertical. In many cases these windshields also include sharply bent, rearwardly projecting, end portions that sometimes also project downwardly to provide what is commonly termed the "wrap-around" type of windshield. Because of the large expanse of glass positioned in front of the vehicle operator it has been found advantageous to tint or color the upper portion of the windshield panel with a dark color such as blue or green or brown to provide a glare shield or glare screen. Such glare screens or shields are usually of graduated or varying degrees of shading being relatively dark at the upper edge of the windshield panel and gradually decreasing in intensity to a perfectly clear untinted glass within approximately the upper one-third (⅓) of the windshield height.

In order to meet with certain statutory safety provisions requiring relatively constant color shading across any one horizontal plane through the tinted portion of the windshield and to also present a windshield having a pleasing appearance, it has been the desire of the windshield manufacturers to have a horizontal cut-off line between the tinted and untinted portions of the windshield and to also have the tinting increase in intensity along horizontal planes from a minimum at the cut-off line to a maximum at the upper edge of the windshield.

In order to provide a tinted band at the top edge of the plastic interlayer sheet which, when bonded between the pair of glass sheets of a conventional windshield panel, will present a substantially horizontal cut-off line between the tinted and untinted portions of the windshield and also have the color or tint intensity in any one horizontal plane substantially uniform across said one plane, it has been found necessary to stretch the previously tinted plastic sheeting to an arcuate form prior to laminating the plastic between the pair of glass panels that make up a conventional laminated glass windshield. This invention concerns the method and apparatus for stretching tinted plastic sheeting into an arcuate shape such that the stretched sheeting can then be cut into sections and placed between previously bent glass panels with the tinted plastic giving a horizontal cut-off line between the tinted and untinted portions of the windshield and horizontal uniform tint planes.

Other objects and advantages of this invention will become readily apparent from a reading of the following description and a consideration of the related drawings wherein:

FIG. 1 is a fragmentary elevational view of the windshield mounting portion of a motor vehicle having a banded windshield formed in accordance with this invention;

FIG. 2 is an enlarged sectional elevational view of the windshield, the view being taken on the line 2—2 of FIG. 1;

FIG. 3 is a diagrammatic side elevational view, with portions broken away and partly in section, of one form of apparatus for stretching plastic sheeting in accordance with this invention;

FIG. 4 is a diagrammatic top plan elevational view, with portions broken away and in section, of the plastic stretching apparatus shown in FIG. 3;

FIG. 5 is a fragmentary top plan view of the plastic stretching portion of the apparatus shown in FIG. 4, this view showing the apparatus at completion of a stretching cycle;

FIG. 6 is a schematic top plan view of the plastic stretching apparatus shown in FIGS. 3 and 4, this view showing the elongation of the plastic while it is being stretched between the tensioning bars with the resulting arcuate shaping of the plastic due to the stretching and heating; and FIG. 7 is a plan elevation of a panel of the stretched plastic that has been cut from the continuous strip shown in FIG. 6.

FIG. 1 shows the forward portion of a motor vehicle body driver's compartment C looking from the rear of the vehicle forwardly through the banded, wrap-around, windshield W. Windshield W (see FIG. 2) is composed of a pair of bent glass panels 11 and 12 that are separated by and bonded to a plastic interlayer sheet 13. The interlayer sheet 13 has a colored or tinted band 14 extending along its upper edge portion that is of graduated intensity varying from a dark color shading at the top edge 16 to a light or clear color shading at the cut-off line 17 where the tinting is completely eliminated. As can be seen from FIGS. 1 and 2, the cut-off line 17 appears as a substantially horizontal line and the tinting increases in intensity from the cut-off line 17 to the top edge 16 with the color intensity along any one horizontal plane across the windshield W being substantially the same. In order to achieve this graduated, constant plane, tinting effect on a curved glass windshield, it is necesary to initially form the tinted interlayer 13 with an arcuately shaped color band 14 so that the band will assume such a position when mounted on the curved glass panels 11, 12 that the band cut-off line 17 and the equal intensity planes are horizontal. To arcuately shape the banded plastic interlayer 13 to properly seat on the curved glass panels 11, 12 has been achieved in the past by various types of complicated plastic stretching frames such as those shown in U.S. Patents 2,593,405, 2,700,007 and 2,873,474. Prior art practices have been slow and expensive and subject to a high degree of individual worker skill which gave variable results. This invention provides a method and apparatus for stretching the banded plastic interlayer sheeting that is fast, inexpensive, continuous and free from reliance on the capabilities or skills of the individual workers who produce the plastic interlayers.

Now looking at FIGS. 3, 4, 5 and 6, which show one form of apparatus for stretching banded plastic in accordance with this invention it will be noted that a continuous, constant width, sheet of tinted or color banded plastic 21 is fed to and passed over the rollers 22 in a chiller room 23 and then through an opening 24 in the wall 25 to guide rolls 26. From the guide rolls 26 the constant width, banded, plastic 21 is passed into a stretching and heating apparatus 27. The stretching and heating apparatus 27 comprises a closed casing 28 having heating units 29 located interiorly thereof with suitable thermostat control means (not shown) to accurately control the temperature within the casing 28. Interiorly of and adjacent the front end wall 28a of the casing 28, where the banded plastic sheeting 21 enters the casing 28, there is located a power operated plastic clamping means 30. This plastic clamping means 30 comprises a stationary base bar 31 and a vertically reciprocable clamping bar 32 adapted to be actuated by a power cylinder 33. It is thought to be obvious from FIG. 3 that as the plastic 21 passes between the bars 31 and 32 operation of the cylinder 33 will permit the clamping bar 32 to anchor the plastic sheeting therebelow on the base bar 31.

Also located within the casing 28 and spaced longitudinally thereof from the plastic clamping apparatus 30 is a second plastic clamping apparatus generally designated by the numeral 35. The plastic clamping apparatus 35 is similar to the apparatus 30, but it is adapted to be reciprocated as a unit lengthwise of the casing 28 as indicated by the double ended arrow 36 (see FIG. 3). The movable clamping apparatus 35 comprises a base bar 37 mounted on a roller supported, trackway guided frame 38. Frame 38 also supports, above the plastic sheeting 21, a vertically reciprocable clamping bar 39. Clamping bar 39 is adapted to be actuated by a power operated cylinder 40. The roller mounted framework 38, that supports the cooperating plastic clamping bars 37, 39 is arranged to be reciprocated lengthwise of the casing 28 by means of power operated cylinders 41 that are connected by piston rods 42 to the framework 38.

From a consideration of FIG. 3, it is now thought to be apparent that when power is applied to the clamping bar actuating cylinders 33 and 40, that a fixed length segment 21s of the banded plastic sheeting 21 will be securely clamped between the two spaced clamping mechanisms 30 and 35. Also, if after clamping of the plastic sheeting segment 21s between the clamping mechanisms 30, 35 the power operated means 41 is energized to cause rearward or rightward movement of the roller mounted framework 38 that supports the clamping mechanism 35, then it should be quite clear that the segment 21s of plastic clamped between the mechanisms 30, 35 will be elongated a predetermined amount depending on the stroke of the piston rod 42. Now looking at FIGS. 4, 5 and 6 particularly, it will be noted that the letter X is used to designate the amount of elongation the plastic sheeting segment 21s that is clamped between the spaced clamping bars 31, 32 and 37, 39. It will also be noted from FIGS. 3, 4 and 5 that when the plastic sheeting section 21s is elongated by the increment X that there will be a symmetrical necking inwardly or concaving of the side edges of the plastic segment 21s such that (see FIG. 5 particularly) the original straight sided plastic segment 21s is reshaped to provide a panel having symmetrically arranged, inwardly bowed, side edges 16, 16.

In order to permanently set the bowed side edge configuration of the stretched plastic segment 21s extending between the clamping means 30, 35 of the stretching apparatus 27, it has been found advantageous to heat the stretched plastic to a predetermined temperature for a predetermined time depending on the particular properties of the plastic utilized for the windshield interlayer. In the samples that have been tested according to this process, it has been found that heating the particular plastic after stretching for about five minutes to a temperature of approximately 250° F. before releasing the stretched plastic from the spaced clamping bars 32, 39 was sufficient to set the side edge curvature of the stretched plastic sufficiently to prevent creep thereof for at least two days. While it has been found necessary to heat the plastic only after it has been stretched, it may be more economical from a production standpoint to maintain a constant heat application on the plastic both during stretching and after stretching due to the fact that the stretching operation requires such a small amount of time as compared to the heating period that is utilized to set the elongation of the plastic sheeting.

The plastic sheeting 21 after leaving the stretching mechanism 35 passes between guide rolls 45 and through an opening 46 in the wall 28b of the casing 28 and thence out across an inspection table 48. The plastic sheeting 21 is moved rearwardly or rightwardly through the various stages of its stretching operation by means of the drive rolls 49. Located just forwardly of the drive rolls 49 and positioned centrally of the width of the plastic sheeting 21 is a disc-type cutter 50 that splits the stretched plastic sheeting 21 into two sections along its longitudinally extending centerline which has been indicated by the numeral 52. After passing through the cutter 50 and through the drive rolls 49 the stretched, concaved edged plastic sheeting 21 is moved across a cutting table 54 where suitable cutter means 55 sever segments 13, 13 from the continuous strip of plastic sheeting 21. It can be seen that by severing the stretched plastic sheet along its longitudinal centerline that two banded windshield segments can be formed at the same time by the same stretching operation and this materially reduces the cost of production of stretched, banded, plastic interlayer sheets for use as interlayers in laminated windshields or the like.

I claim:

1. In a continuous method of reshaping sections of a constant width sheet of plastic to provide plastic sections having at least one inwardly bowed, longitudinally extending, side edge comprising the steps of successively clamping quadrilateral sections of said plastic sheet in a stretching mechanism and stretching each clamped section in the plane thereof to such a degree that the stretched section is caused to neck down intermediate its clamped ends to produce at least one inwardly bowed side edge, heating said stretched, bowed-edged plastic section, while it is held stretched, sufficiently to set the shape of the stretched plastic section, splitting each of said stretched sections substantially along their longitudinally extending centerlines, and thereafter severing the stretched bowed-edged sections from said continuous sheet of plastic.

2. In a method of reshaping a rectangular sheet of plastic having color bands extending along the opposite side edges thereof, the steps of stretching the plastic sheet in the plane thereof in a direction substantially parallel to the banded edges to such a degree as to cause a necking down of the sheet transversely of the direction of stretch to produce concavely bowed, banded, edge portions on the sheet and heating the sheet while it is held in the stretched condition for a sufficient time to set the stretched shape of the plastic sheet.

3. In a method of reshaping a rectangular sheet of plastic having color bands extending along the opposite side edges thereof, the steps of stretching the plastic sheet in the plane thereof in a direction substantailly parallel to the banded edges to such a degree as to cause a necking down of the sheet transversely of the direction of stretch to produce concavely bowed, banded, edge portions on the sheet, heating the sheet while it is held in the stretched condition for a sufficient time to set the stretched shape of the plastic sheet, and splitting the stretched plastic sheet substantially centrally between its banded edge portions to produce a pair of similar plastic sections each having a concavely bowed side edge and an opposite straight edge.

4. In a continuous method of reshaping rectangular sections of a continuous, constant width, sheet of plastic having color bands extending along the opposite side edges thereof, the steps of successively stretching spaced rectangular sections of the sheet in the plane of the sheet and in a longitudinal direction to such a degree as to cause a transverse necking down of each successive stretched section intermediate its ends to provide symmetrical, inwardly bowed, banded, side edges on each stretched section, heating the stretched sections to such a temperature, while they are held in the stretched condition, to set the elongated stretched shape of each section and cutting the stretched sections substantially along their longitudinally extending centerline.

5. In a continuous method of reshaping rectangular sections of a continuous, constant width, sheet of plastic having color bands extending along the opposite side edges thereof, the steps of successively stretching spaced rectangular sections of the sheet in the plane of the sheet and in a longitudinal direction to such a degree as to cause a transverse necking down of each successive stretched section intermediate its ends to provide symmetrical, inwardly bowed, banded side edges on each stretched section, heating the stretched sections to such a temperature, while they are held in the stretched condition, to set the elongated stretched shape of each section, cutting the stretched sections substantially along their longitudinally extending centerline, and severing the individually stretched sections from the continuous sheet of plastic.

References Cited in the file of this patent

UNITED STATES PATENTS

| | | |
|---|---|---|
| 2,079,584 | Hazell et al. | May 4, 1937 |
| 2,515,830 | Mahler | July 18, 1950 |
| 2,728,941 | Alles et al. | Jan. 3, 1956 |
| 2,817,117 | Shields et al. | Dec. 24, 1957 |
| 2,854,697 | Ryan | Oct. 7, 1958 |
| 2,856,634 | Ames | Oct. 21, 1958 |
| 2,873,474 | Shields et al. | Feb. 17, 1959 |
| 2,937,407 | Richardson | May 24, 1960 |